(12) United States Patent
Holbein et al.

(10) Patent No.: US 7,458,535 B2
(45) Date of Patent: Dec. 2, 2008

(54) BELT RETRACTOR FOR A VEHICLE SAFETY BELT

(75) Inventors: Wolfgang Holbein, Alfdorf (DE); Martin Prokscha, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 429 days.

(21) Appl. No.: 11/121,658

(22) Filed: May 4, 2005

(65) Prior Publication Data

US 2005/0247812 A1    Nov. 10, 2005

(30) Foreign Application Priority Data

May 5, 2004    (DE) ................ 10 2004 022 134

(51) Int. Cl.
*B65H 75/48* (2006.01)

(52) U.S. Cl. ............... 242/375.2; 242/382.1; 242/390.8

(58) Field of Classification Search ............ 242/390.8, 242/382.1–382.4, 375.2, 385.1
See application file for complete search history.

(56) References Cited

U.S. PATENT DOCUMENTS

| | | | |
|---|---|---|---|
| 4,787,569 A * | 11/1988 | Kanada et al. | 242/371 |
| 6,676,056 B2 * | 1/2004 | Peter | 242/374 |
| 6,685,124 B2 * | 2/2004 | Frank | 242/374 |
| 6,702,089 B1 | 3/2004 | Scheck et al. | |
| 6,840,474 B2 | 1/2005 | Honl et al. | |
| 6,921,041 B2 | 7/2005 | Biller | |
| 7,051,860 B2 | 5/2006 | Scheck et al. | |
| 7,083,136 B2 * | 8/2006 | Mori et al. | 242/390.8 |
| 2005/0173580 A1 | 8/2005 | Lucht et al. | |
| 2005/0247811 A1 * | 11/2005 | Prokscha et al. | 242/374 |

FOREIGN PATENT DOCUMENTS

| | | |
|---|---|---|
| DE | 4212292 | 10/1993 |
| DE | 29710827 | 12/1997 |
| DE | 19912789 | 9/2000 |
| DE | 19926994 | 12/2000 |
| DE | 19954232 | 6/2001 |
| DE | 20115316 | 3/2002 |
| DE | 20212088 | 2/2003 |
| DE | 20217804 | 5/2003 |
| DE | 10207846 | 8/2003 |
| DE | 10309411 | 10/2003 |
| DE | 10234501 | 2/2004 |
| EP | 0048516 | 3/1982 |
| WO | 03099619 | 12/2003 |

* cited by examiner

*Primary Examiner*—Sang Kim
(74) *Attorney, Agent, or Firm*—Tarolli, Sundheim, Covell & Tummino LLP

(57) ABSTRACT

A belt retractor for a vehicle safety belt has a frame, a belt reel which is rotatably mounted in the frame, a locking mechanism which is adapted to block a rotation of the belt reel in an unwinding direction of the safety belt in a vehicle sensitive and/or seat belt sensitive manner and a pretensioning drive which is adapted to drive the belt reel in a wind up direction of the safety belt and in the unwinding direction. A locking means is provided which prevents a reverse rotation of the belt reel in the unwinding direction, after the pretensioning drive has driven the belt reel in the wind up direction and has thereby pretensioned the safety belt.

11 Claims, 7 Drawing Sheets

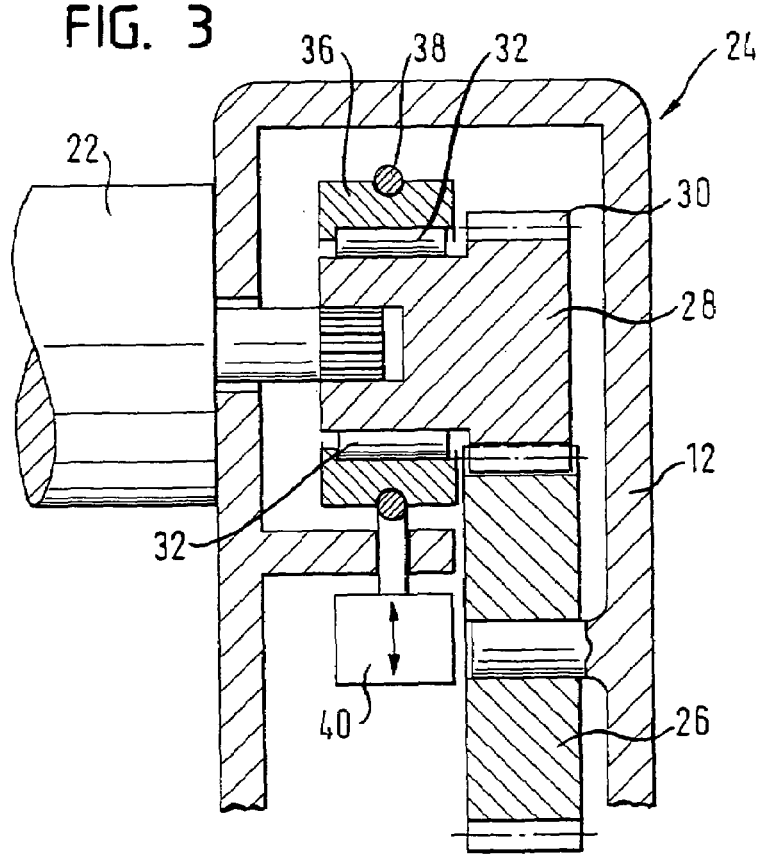
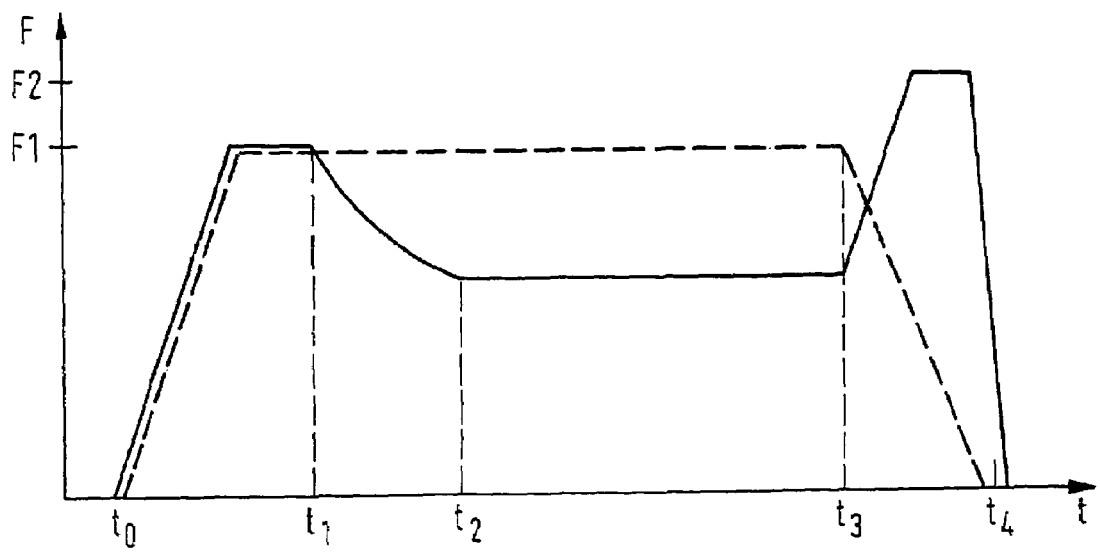

BELT RETRACTOR FOR A VEHICLE SAFETY BELT

The invention relates to a belt retractor for a vehicle safety belt.

BACKGROUND OF THE INVENTION

Such belt retractor has a frame, a belt reel which is rotatably mounted in the frame, a locking mechanism which is adapted to block a rotation of the belt reel in an unwinding direction of the safety belt vehicle-sensitively and/or sensitively to the belt webbing, and a pretensioning drive which is adapted to drive the belt reel in a wind up direction of the safety belt and in the unwinding direction.

The belt retractor is part of an active vehicle occupant restraint system by means of which, upon recognizing a critical vehicle situation, various precautions are taken to protect a vehicle occupant from negative consequences in the best possible way. The measures taken may, for example, include changing the inclination of a back rest of a vehicle seat, closing the vehicle windows, pretensioning the safety belt, and further measures. All these measures are reversible; as soon as the vehicle state that was recognized as being critical does no longer exist, the vehicle is again returned to its initial state. As regards the belt retractor, this means that the safety belt that was wound up by the pretensioning drive upon recognizing a critical vehicle situation to eliminate, as far as possible, the so-called belt slack in the safety belt, is again released, as soon as the vehicle state recognized as being critical does no longer exist. The possibility to actively release the safety belt again and re-establish the original state clearly distinguishes a pretensioning drive from a conventional belt tensioner drive. The latter solely serves to tension the safety belt directly before an accident; no return feature is provided. A further distinction between a conventional belt tensioner drive and a pretensioning drive is the belt webbing force achieved when the safety belt is tensioned. The belt webbing forces generated by a pretensioning drive are several times smaller than those generated by a conventional belt tensioner drive (up to clearly more than 1000 N).

In belt retractors having a pretensioning drive, the locking mechanism may be activated "by accident", when the belt reel was rotated in the wind up direction of the safety belt and the safety belt was pretensioned, for example if the vehicle is braked. This may result in that a locking pawl triggered by the locking mechanism completely engages in a locking toothing associated therewith, so that the belt reel is completely blocked. Since the locking toothing normally is undercut, i.e. when being subjected to a load it exerts a force entraining the locking pawl into the locking toothing so as to be able to reliably transfer the high locking loads acting in an accident between the locking toothing and the locking pawl, a reverse rotation of the belt reel in the wind up direction is necessary to permit the locking pawl to be moved out of the locking toothing again. It follows from this that prior to releasing the pretensioned safety belt, the belt webbing force at first increases because of the rotation of the belt reel to release the locking pawl. Since the safety belt has already been pretensioned anyway, the vehicle occupant experiences this as being unpleasant.

It is, therefore, the object of the invention to further develop a belt retractor of the aforementioned kind to the effect that the increase of the belt webbing force when returning from a state in which the safety belt is pretensioned to the initial state may be prevented.

BRIEF DESCRIPTION OF THE INVENTION

In order to achieve this object, in accordance with the invention there is provided a locking means preventing a reverse rotation of the belt reel in the unwinding direction, after the pretensioning drive has driven the belt reel in the wind up direction and has thereby pretensioned the safety belt. The invention is founded on the basic idea to prevent the locking pawl from hooking into the undercut locking toothing by preventing the belt reel from rotating in the unwinding direction, when the safety belt is pretensioned. Namely, if the belt reel is non-rotatably held when the safety belt is pretensioned, it is not detrimental if the locking pawl is guided into the locking toothing. As soon as the vehicle state which has caused the locking mechanism to respond is over again, the locking pawl is returned to its initial position, i.e. out of engagement with the locking toothing. This is reliably and without any problems possible, because for lack of a rotation of the belt reel in the unwinding direction of the safety belt, the locking pawl was not able to completely engage in the locking toothing.

According to a preferred embodiment of the invention, it is provided that the locking means comprises a return stop. This return stop may, for example, include a wrap spring and/or a clamp roller free-wheel mechanism. It is possible as well to provide a locking pawl which is actuated by an actuator and locks the belt reel, when the safety belt is pretensioned.

Advantageous designs of the invention will be apparent from the sub-claims.

BRIEF DESCRIPTION OF THE DRAWINGS

The invention will be described in the following with the aid of various embodiments which are represented in the accompanying drawings, in which:

FIG. 3 shows on an enlarged scale schematically a section through the locking means of the belt retractor of FIG. 1;

FIG. 4 schematically shows a diagram of the adjusting belt webbing force during a pretensioning action with a conventional belt retractor and with a belt retractor in accordance with the invention;

DETAILED DESCRIPTION OF THE INVENTION

Figure 1:
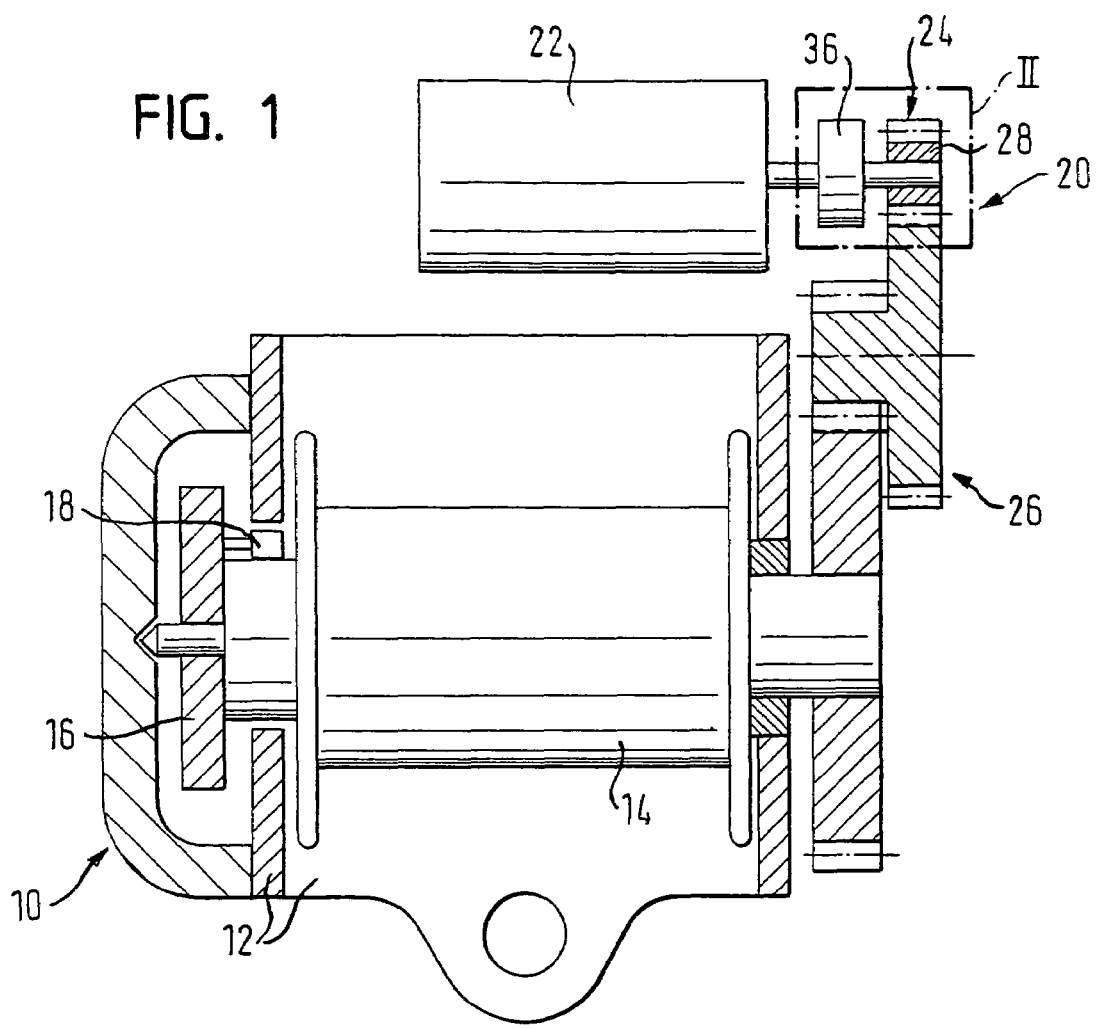
FIG. 1 shows a schematic, partially sectioned view of a belt retractor in accordance with the invention.

In FIG. 1, there is shown a belt retractor 10 comprising a frame 12, in which a belt reel 14 is rotatably mounted. A safety belt (not shown) may be received on the belt reel 14. There is provided a locking mechanism 16 that is adapted to actuate a locking pawl 18, so that the belt reel 14 may be blocked against a rotation in the unwinding direction of the safety belt in a vehicle-sensitive manner and/or a manner sensitive to the safety belt.

There is provided a pretensioning drive 20 which is formed of a motor 22, a locking means 24, and a gear 26. The motor 22 may rotate the belt reel 14 via the gear 26 both in the wind up direction of the safety belt and in the unwinding direction.

The locking means 24 comprises a drive member 28 which is non-rotatably coupled to the motor 22 and provided on its outside with a toothing 30, in which a toothed wheel of the gear 26 engages. Axially next to the toothing 30, the drive member 28 is provided with a cylindrical surface which cooperates with several clamp rollers 32. The clamp rollers are arranged in recesses 34 of a free-wheel disk 36. Each recess 34 is formed of a pocket, whose dimensions are somewhat larger than those of the corresponding clamp rollers 32, and a ramp adjoining the pocket in a circumferential direction (clockwise with respect to FIG. 2). In this manner there is formed a clamp roller free-wheel mechanism known per se, which permits a rotation of the drive member 28 relative to the free-wheel disk 36 in one direction of rotation, but blocks it in the other direction of rotation.

On the outer surface of the free-wheel disk 36, there is arranged a wrap spring 38, one end 42 of which is firmly held relative to the frame 12 of the belt retractor. The other end 42' of the wrap spring 38 is acted upon by an actuator 40 which is adapted to adjust the corresponding end in the direction of the arrow P of FIG. 2. Thereby, the bias and thus also the frictional force acting between the wrap spring 38 and the free-wheel disk 36 are changed. Actor 40 can be a bistable solenoid.

When, for the purpose of the pretensioning of the safety belt, the belt reel is driven in the wind up direction (the direction of rotation 1 of FIG. 2), the drive member 28 rotates without any restriction on account of the free-wheel mechanism. Thus, the belt reel may be rotated in the wind up direction, until the force level F1 (see FIG. 4) is reached. In a conventional belt retractor, the motor 22 would then be switched off (the point of time $t_1$), so that under the effect of the belt webbing force the belt reel slightly rotates in the unwinding direction, until at the point of time $t_2$ a lower force level is reached (see the curve in FIG. 4 illustrated with continuous lines). If at the point of time $t_3$ it is detected that the vehicle state assessed as being critical does no longer exist, and the pretensioning of the safety belt is intended to be terminated, the belt reel has at first to be rotated in the wind up direction so as to enable the locking pawl, which was entrained into the locking toothing during the rotation of the belt reel in the unwinding direction, to be moved out of the locking toothing again. In so doing, the belt reel 14 has to be rotated in the wind up direction beyond the position reached at the end of the pretensioning action, so that a higher force level $F_2$ is reached. It is only afterwards that the belt reel may be rotated in the unwinding direction, so that the belt webbing force drops to the initial value again.

In the belt retractor in accordance with the invention, however, at the point of time $t_1$, i.e. after terminating the pretensioning action proper and prior to switching off the motor 22, the actuator 40 is triggered, which acts upon the wrap spring 38 in the sense of reducing its inner diameter by pressing the end 42' towards the end 42. Thereby, the free-wheel disk 36 is blocked, and this in turn also blocks the drive member 28 via the clamp rollers 32 against a rotation in the unwinding direction of the safety belt (the direction 2 of FIG. 2). Namely, as soon as the drive member 28 tries to rotate in the direction of rotation 2, the clamp rollers 32 wedge themselves between the outer surface of the drive member 28 and the ramp of their recess 34. This prevents a rotation of the belt reel in the unwinding direction of the safety belt, so that even after the motor 22 was switched off at the point of time $t_1$, the belt webbing force remains unchanged on the level $F_1$ (see FIG. 4).

If the pretensioning is to be terminated again, the motor 22 is triggered at the point of time $t_3$ in such a manner that in the wind up direction it provides a torque corresponding to that which was applied for the purpose of the pretensioning. Subsequently, the actuator 40 releases the wrap spring 38, so that the latter expands and permits the free-wheel disk 36 to rotate together with the clamp rollers 32 and the drive member 28 in the unwinding direction of the safety belt (the direction of rotation 2 of FIG. 2). It is clearly apparent from FIG. 4 that when changing from a state in which the safety belt is pretensioned to a state in which the safety belt is again released, no brief increase of the belt webbing force is necessary but the belt webbing force drops directly. Triggering the motor prior to releasing the actuator is not necessary for the functioning of the belt retractor; the free-wheel disk 36 may also be directly released. However, if the motor is triggered beforehand, there will be no jolt in the safety belt, because the system is slightly pretensioned, and the tension in the safety belt drops gradually.

Figure 5:
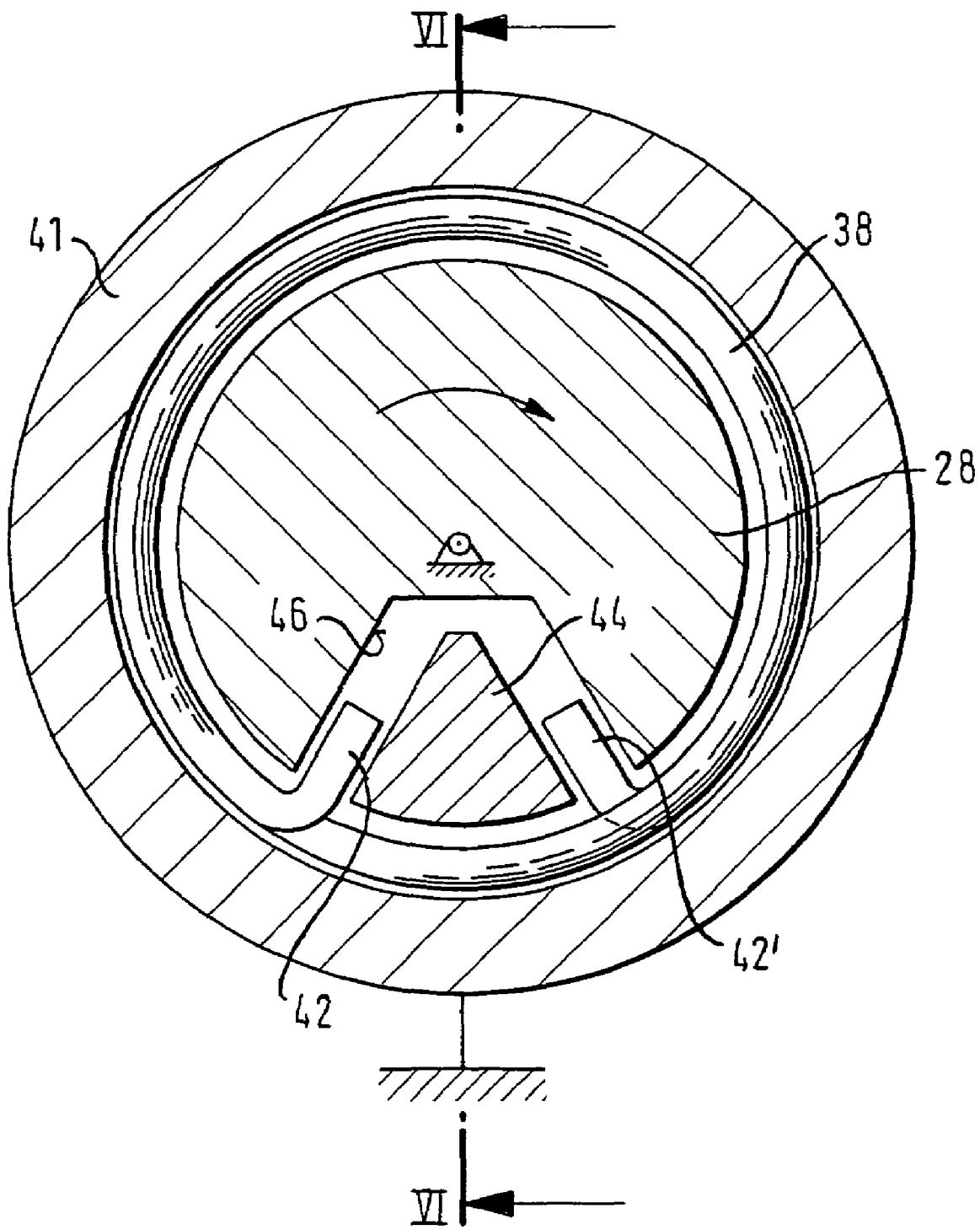
FIG. 5 shows in a section corresponding to the plane II-II of FIG. 1 one variant of an embodiment of the locking means.
Figure 6:
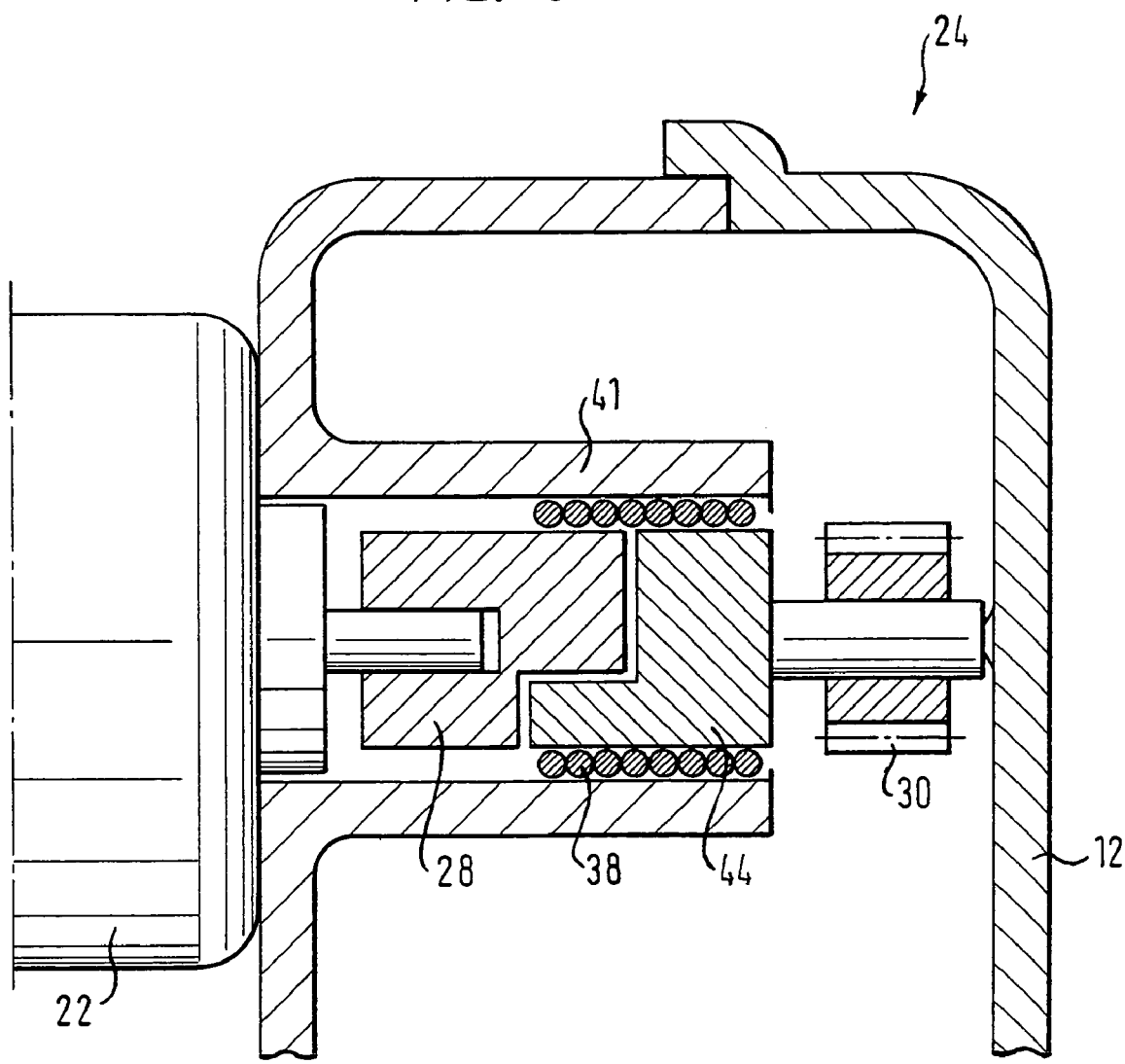
FIG. 6 schematically shows a section along the plane VI-VI of FIG. 5.

In FIGS. 5 and 6, there is shown a variant of an embodiment of the locking means 24. The same reference numbers are used for the members known from the first embodiment, and reference is made in this respect to the above explanations.

Figure 2:
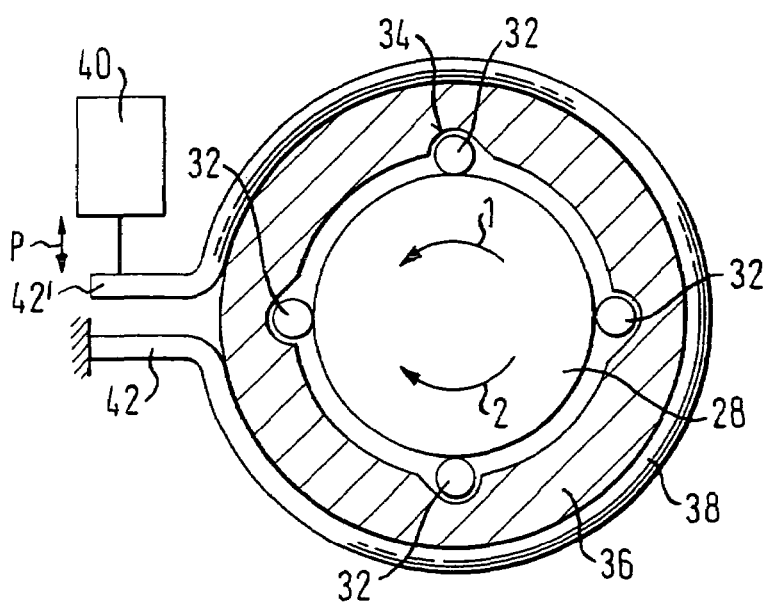
FIG. 2 schematically shows a section along the plane II of FIG. 1.

The difference to the locking means as shown in FIGS. 2 and 3 is that no actuator is necessary to have the locking means respond; the locking means is self-locking if it is subjected to loads from the side of the belt reel. Such a locking means is generally known in the prior art under the term load moment lock.

In this arrangement, the wrap spring 38 is placed in a cylindrical housing 41 which is firmly mounted with respect to the frame 12. The two ends 42, 42' of the wrap spring radially project inwards, with each end 42 being adapted both to be acted upon by the drive member 28 and to serve as a buttress for a driven member 44. In the embodiment shown, the drive member 28 comprises a broad groove 46, against the side walls of which the ends 42 rest. The driven member 44 is disposed between the two ends 42, 42' of the wrap spring 38 and thus approximately centrally in the groove. At the same time the winding direction of the wrap spring 38 is selected in such a manner that, proceeding from each end 42, the wrap spring 38 leads away from the driven member 44, i.e. referring to the representation of FIG. 5, it extends further clockwise at the left end 42 and, proceeding from the right end 42', it extends anticlockwise. This arrangement causes the locking means to permit a rotation of the driven member 44 by the motor 22, but to block a rotation of the motor 22 by the driven member 44. If, for example, the drive member 28 is rotated in the direction of the arrow of FIG. 5, it engages the right end 42' of the wrap spring 38. Thereby, the latter is acted upon in the direction of a reduction of its outer diameter, so that the friction in the housing 41 is reduced. In so doing, the right end 42' is pressed against the driven member 44, so that finally the latter is entrained. If the drive member 28 is rotated in the opposite direction, the driven member 44 is likewise entrained in the opposite direction, namely by the left end 42 of the wrap spring. However, if the driven member 44 attempts to entrain the drive member 28, it moves against the one end or the other end 42, 42' of the wrap spring 38. Thereby, the latter is acted upon in the direction of an enlargement of its outer diameter, so that the friction in the housing 41 increases, which leads to a self-locking.

This functioning results in that the motor 22 is able to drive the belt reel 14 both in the wind up direction and in the unwinding direction. However, if, for example after a pretensioning action, a force which tries to rotate the belt reel in the unwinding direction is exerted by the safety belt on the belt reel, the wrap spring 38 blocks such a rotation. This ensures that the belt webbing force remains on the level $F_1$ of FIG. 4, even if the motor 22 is turned off.

Other kinds of load moment locks are known from the prior art. For a belt retractor in accordance with the invention, it is possible to use, in principle, any type of load moment lock which permits a torque transmission from the drive to the output in both directions of rotation, but blocks a return torque from the output to the drive (also in both directions of rotation). One example for such a load moment locking device is the load moment lock SIAM of Messrs. Ringspann. Other examples may be found in the German Patent Applications DE 199 26 994, DE 199 54 232, DE 199 12 789, DE 102 07 846, and DE 103 09 411.

Figure 7:
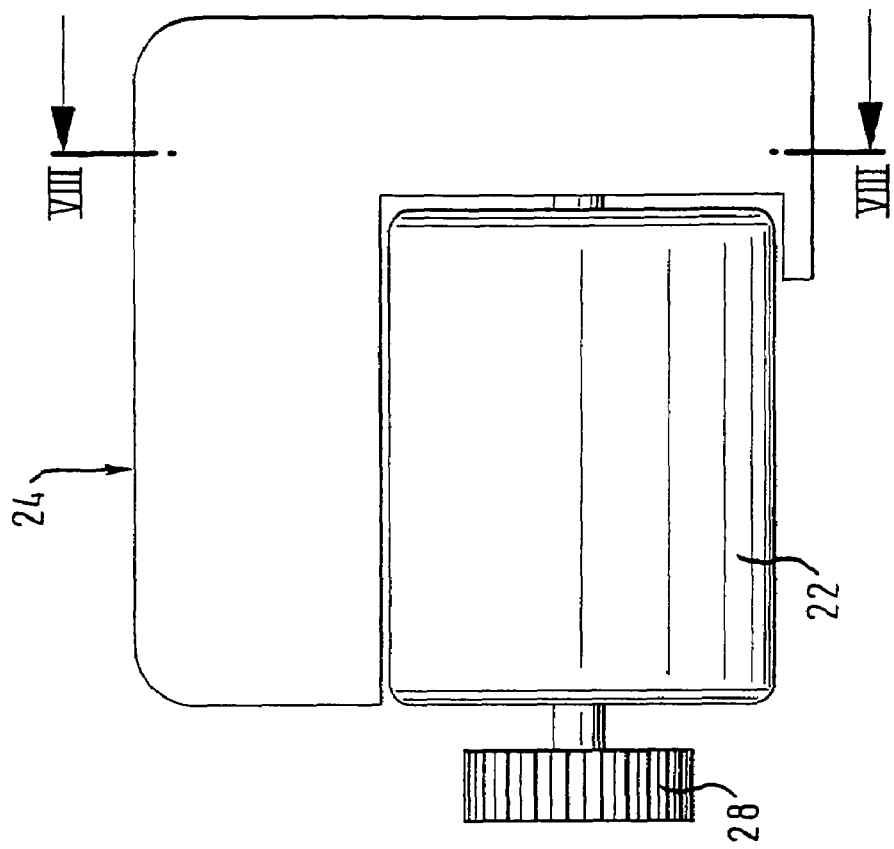
FIG. 7 shows a side view of a locking means for a belt retractor according to a second embodiment of the invention.
Figure 8:
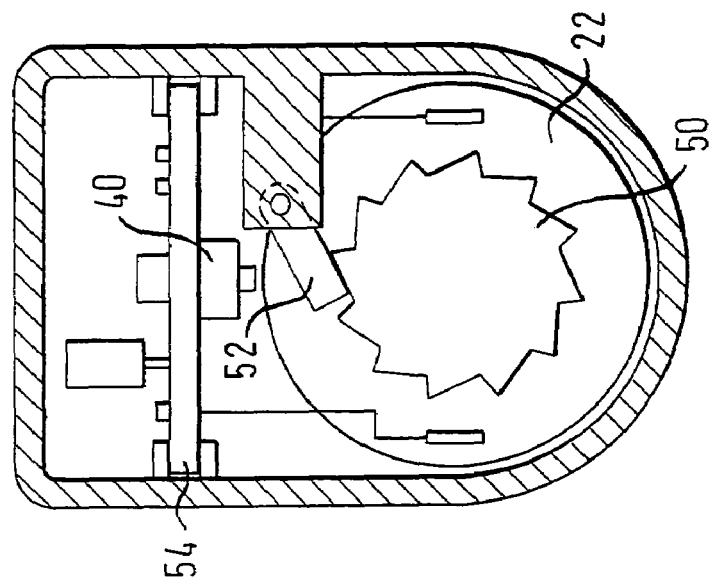
FIG. 8 shows a section along the plane VIII-VIII of FIG. 7.
Figure 9:
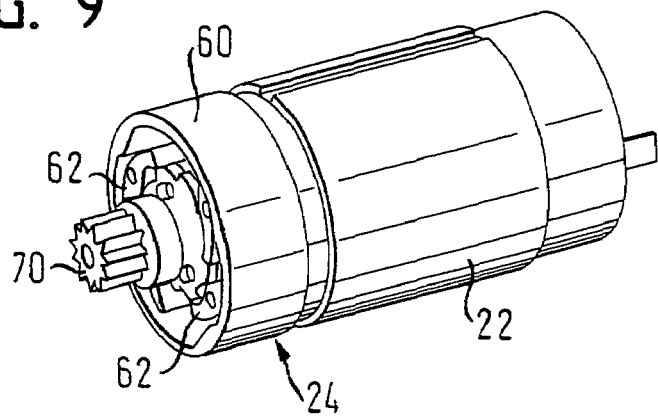
FIG. 9 shows in a perspective view a locking means for a belt retractor according to a third embodiment of the invention.
Figure 10:
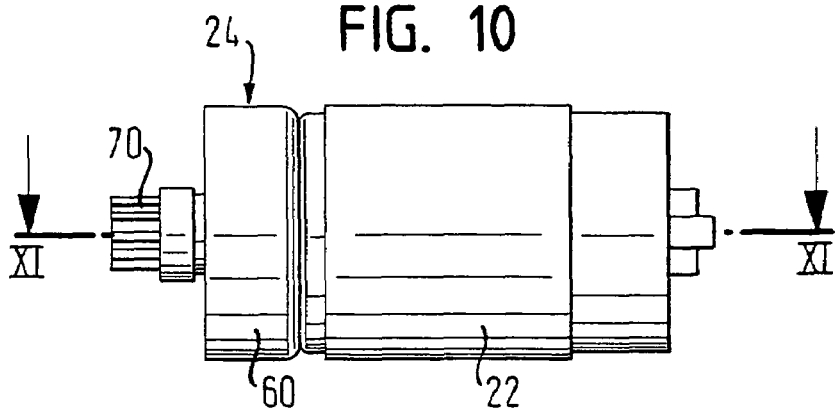
FIG. 10 shows the locking means of FIG. 9 in a side view.
Figure 11:
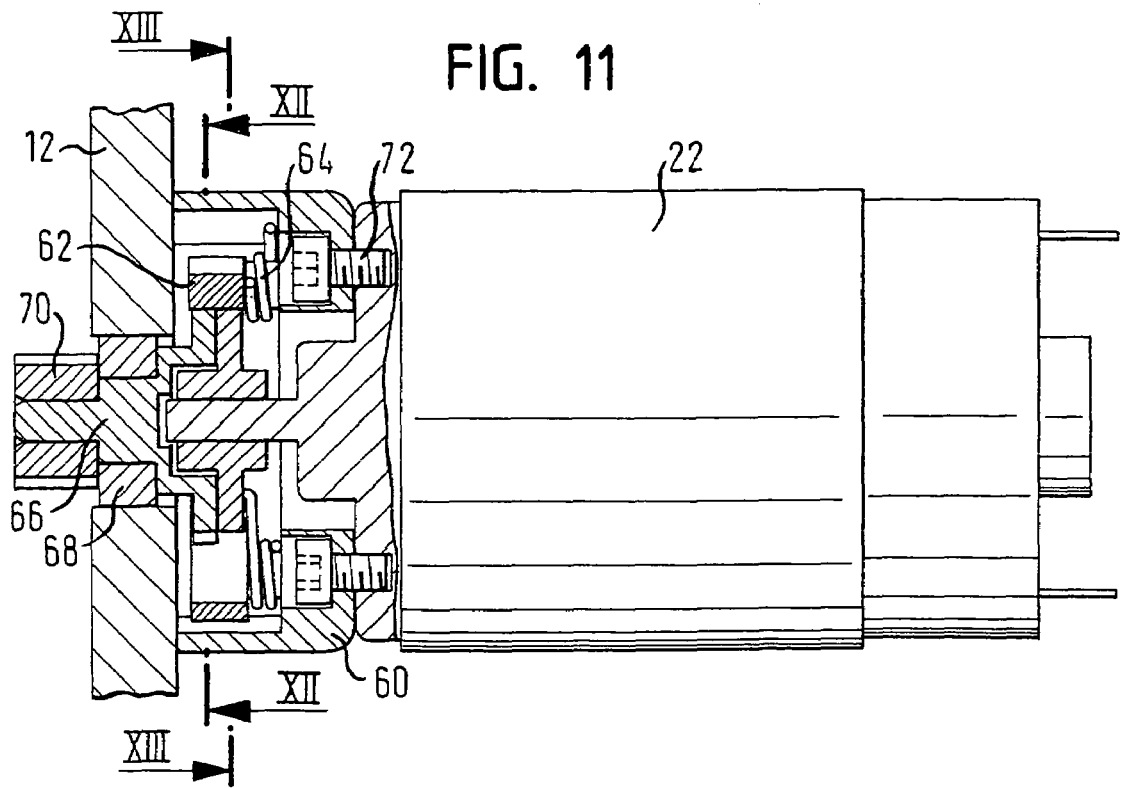
FIG. 11 shows a section along the plane XI-XI of FIG. 10.
Figure 12:
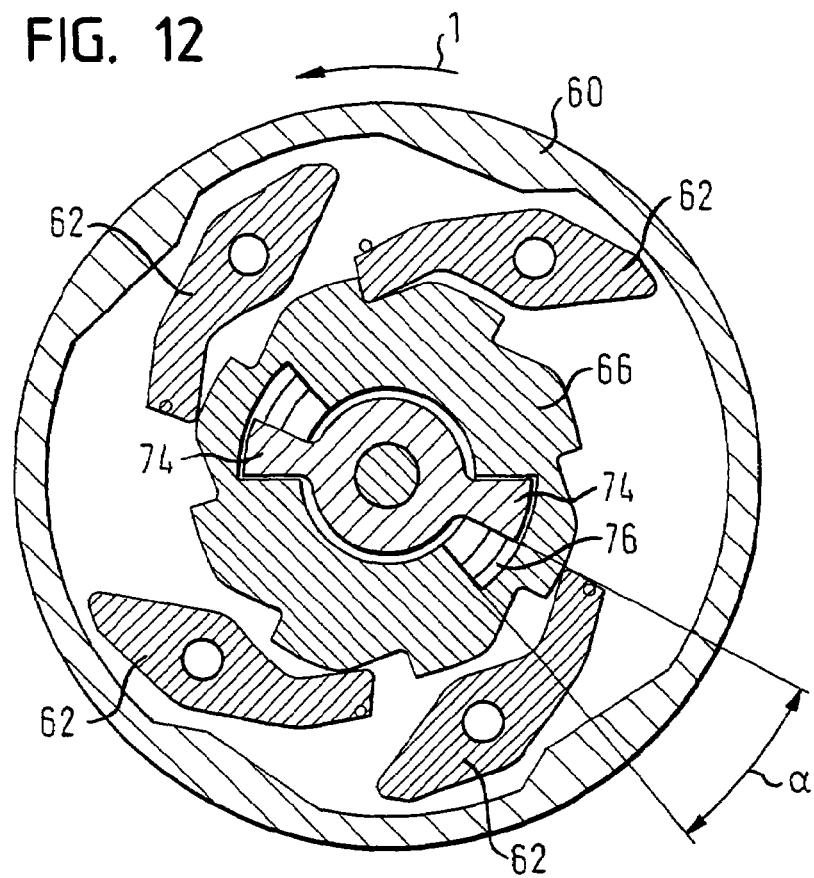
FIG. 12 shows a section along the plane XII-XII of FIG. 10, with the locking means being operated in the wind up direction of a pretensioning action.

In FIGS. 7 and 8, a second embodiment of the locking means 24 is shown. To the shaft of the motor 22 there is coupled a locking wheel 50 with which a locking pawl 52 is associated. The latter cooperates with an actuator 40 which is mounted together with a suitable control member on a board 54. The locking pawl 52, together with the locking wheel 50, serve to block the motor 22 and thus the belt reel 14 against a rotation in the unwinding direction of the safety belt, after the latter was pretensioned. For this purpose, the locking pawl 52 may be engaged in the locking wheel 50, after the safety belt has been pretensioned and before the motor 22 is turned off (see the state shown in FIG. 8). Thereby, a rotation of the belt reel in the unwinding direction is prevented. If the pretensioning of the safety belt is to be terminated, the motor 22 is at first driven in the wind up direction, until it provides a torque corresponding to that which was applied for the purpose of the pretensioning action. Then, the locking pawl 52 is withdrawn from the locking wheel 50. Subsequently, the motor 22 may be driven in the unwinding direction of the safety belt.

Depending on the design of the actuator 40, the locking pawl 52 may be caused to engage in the locking wheel 50 either by the activation of the actuator or by its deactivation. The toothing of the locking wheel 50 is designed without an undercut, so that no reverse rotation of the locking wheel 50 is required if the locking pawl 52 is to be moved out of the toothing of the locking wheel.

On the board 54, there may be provided suitable sensors detecting the position of the locking pawl 52. For this purpose optical or even magnetic sensors, in particular Hall sensors, are suitable.

In FIGS. 9 to 13, there is shown a locking means 24 for a third embodiment of the belt retractor. The same reference numbers are used for the components known from the preceding embodiments, and reference is made in this respect to the above explanations.

In the third embodiment, there is used as a locking means 24 a load moment lock which operates similarly to the one shown in FIGS. 5 and 6. This locking means is, however, based on a pawl-locking coupling that serves as a blocking means, when a torque is transmitted from the belt reel towards the motor 22, but permits a rotation from the motor 22 to the belt reel.

The load moment lock comprises a housing 60 which is screwed to the motor 22. Inside the housing 60, there are disposed several locking pawls 62, each of which is acted upon by a spring 64 to assume a locking position. In the locking position, they engage a locking wheel 66 which is rotatably mounted by means of a bearing 68 and cooperates with a pinion 70 which is connected to the belt reel 14 via toothed wheels (not represented).

Concentrically with the locking wheel 66, there is disposed a release wheel 72 which is adapted to be rotated relative to the locking wheel 66 by an angular range $\alpha$. For this purpose the release wheel 72 is provided with two wing-like protrusions 74 arranged in a recess 76 of the locking wheel 66, this recess extending over an angular range that is larger than that occupied by the protrusions 74. When the motor 22 is driven in a direction which results in the safety belt being wound up on the belt reel 14, the release wheel 72 rotates in the direction of the arrow 1 of FIG. 12. In so doing, the protrusions 74 rest against the front surfaces of the recesses 76 as seen in the direction of rotation, so that the locking wheel 66 is entrained anticlockwise. In this state, the outer contour of the release wheel 72 "disappears" behind the outer contour of the locking wheel 66. In so doing, the locking pawls 62 slip over the corresponding locking teeth of the locking wheel 66, so that they prevent a reverse rotation of the locking wheel 66 and thus of the belt reel 14, as soon as one of the locking pawls rests against the nearest locking tooth. Since the locking pawls 62 are disposed at angular distances that are offset with respect to the spacing of the locking teeth, the maximum reverse rotation is very small.

Figure 13:
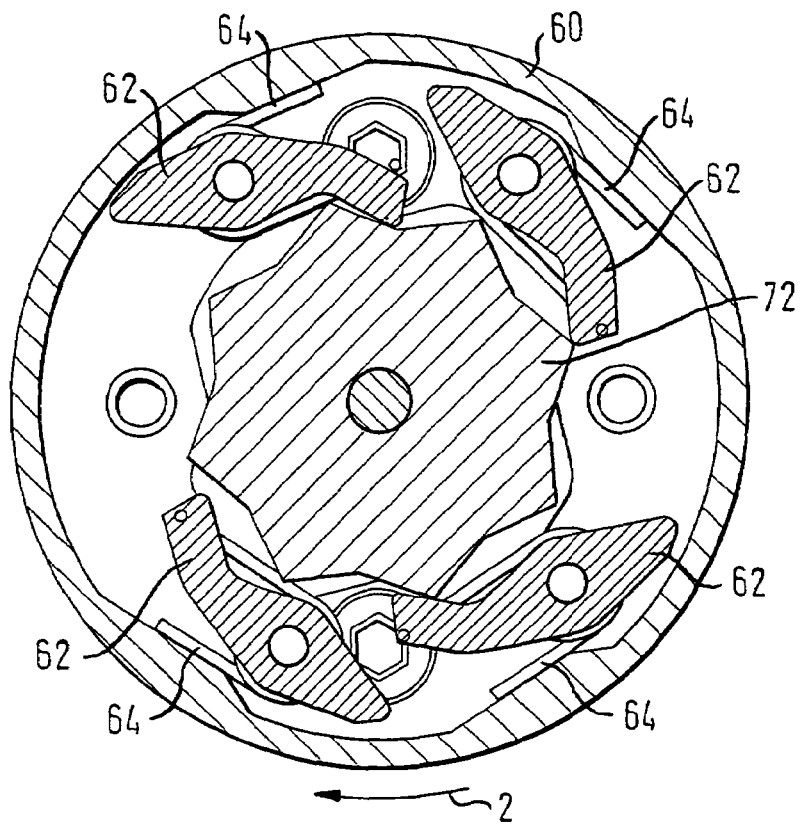
FIG. 13 shows a section along the plane XIII-XIII of FIG. 10, with the locking means being operated in the unwinding direction.

When the motor 22 is rotated in the opposite direction, i.e. in the direction of the arrow 2 of FIG. 13, which leads to the unwinding of the safety belt, at first the release wheel 72 rotates by the angular range a relative to the locking wheel 66. Thereby, the profiled outer contour of the release wheel presses the locking pawls 62 radially outwards (see FIG. 13), so that the locking pawls are no longer able to engage in the locking teeth of the locking wheel 66. Thus, the motor 22 may rotate the belt reel 14 in the unwinding direction.

The invention claimed is:

1. A belt retractor for a vehicle safety belt, having a frame, a belt reel which is rotatably mounted in said frame, a locking mechanism which is adapted to block rotation of said belt reel in an unwinding direction of said safety belt, a pretensioning drive which is adapted to drive said belt reel in a wind up direction of said safety belt and in said unwinding direction, and a locking means separate from said locking mechanism which prevents a reverse rotation of said belt reel in said unwinding direction after said pretensioning drive has driven said belt reel in said wind up direction and has thereby pretensioned said safety belt.

2. The belt retractor according to claim 1, characterized in that said locking means comprises a return stop.

3. The belt retractor according to claim 2, characterized in that said return stop comprises a wrap spring.

4. The belt retractor according to claim 3, characterized in that said return stop comprises an actuator which is adapted to act upon an end of said wrap spring.

5. The belt retractor according to claim 2, characterized in that said return stop comprises a locking pawl which is actuated by an actuator.

6. The belt retractor according to claim 1, characterized in that said locking means comprises a load moment lock.

7. The belt retractor according to claim 6, characterized in that said load moment lock comprises a locking wheel, several locking pawls, and a release wheel, said release wheel being rotatable by a limited angle relative to said locking wheel.

8. The belt retractor according to claim 7, characterized in that said release wheel is coupled to a drive motor.

9. The belt retractor according to claim 7, characterized in that said release wheel has such an outer contour that it is able to press said locking pawls out of engagement with locking teeth of said locking wheel.

10. The belt retractor according to claim 1, wherein the pretensioning drive applies a constant pretensioning force to the safety belt after driving said belt reel in the wind up direction.

11. The belt retractor according to claim 1, wherein the locking mechanism has a pawl to block rotation of the belt reel, the locking means having a member engageable with a drive member coupled to the belt reel to prevent reverse rotation of the belt reel.

* * * * *